Patented Oct. 14, 1952

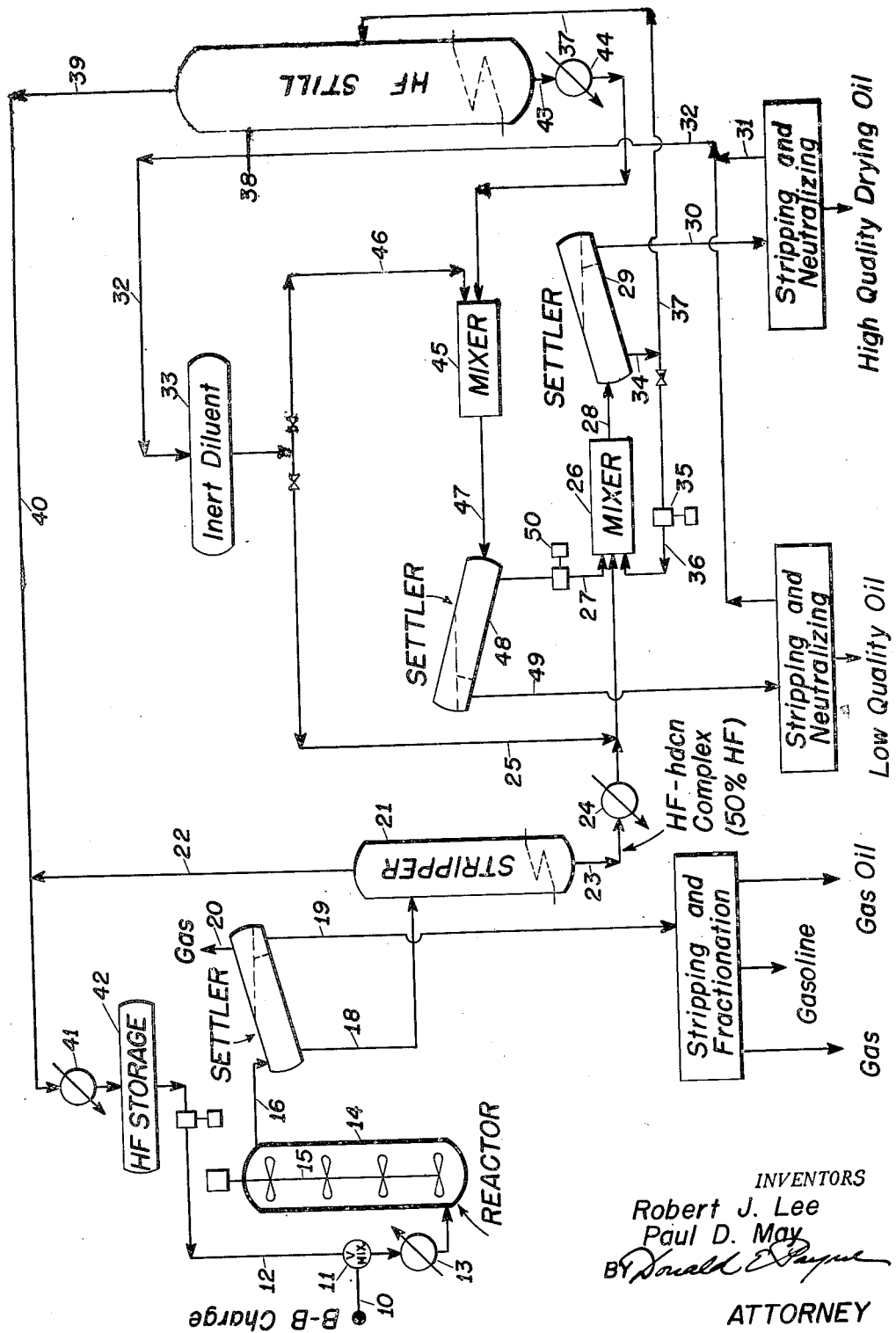

2,614,132

UNITED STATES PATENT OFFICE 2,614,132

RECOVERY OF DRYING OILS FROM HF-HYDROCARBON COMPLEXES

Robert J. Lee, La Marque, and Paul D. May, Galveston, Tex., assignors to Pan American Refining Corporation, Texas City, Tex., a corporation of Delaware Application June 12, 1951, Serial No. 231,196

13 Claims. (Cl. 260—666)

This invention relates to the recovery of drying oils from HF-hydrocarbon complexes and it pertains more particularly to the production of highly unsaturated oils of high maleic anhydride value substantially uncontaminated with darker colored, more saturated hydrocarbons which are also formed in the continuous operation of such a process.

It is known that hydrogen fluoride reacts with many hydrocarbons to form HF-hydrocarbon complexes and that drying oils can be obtained from such complexes by hydrolysis and/or neutralization at low temperatures. It has been suggested that such HF-hydrocarbon complexes may be treated with aqueous HF of constant boiling composition (U. S. 2,440,459) and in a copending application Serial No. 24,958 it is proposed that an aqueous HF of higher HF content be employed for releasing drying oil from said complex and thereby obtaining a drying oil of increased body or viscosity. It has been found, however, that during continuous operation of such processes, the enriched aqueous HF which is obtained by treating HF-hydrocarbon complex even with a constant boiling mixture results in a gradual build-up of materials which are soluble in aqueous HF. An object of this invention is to provide an improved process for eliminating from the system those hydrocarbons which are soluble in aqueous HF so that such materials which are dark in color and relatively saturated will not contaminate the desired light colored drying oil of high unsaturation and high maleic anhydride value.

A further object of the invention is to provide a continuous process for making drying oils from aromatic-free hydrocarbon charging stocks in which process both substantially anhydrous HF and an aqueous HF containing about 40 to 45 weight per cent HF can be continuously recycled for reuse in the system, the anhydrous HF being recontacted with additional hydrocarbon charging stock, and the aqueous HF after removal of dark colored hydrocarbon contaminants being recycled for treating the HF-hydrocarbon complex which is formed in the hydrocarbon treating step. A particular object of the invention is to provide a process which will produce maximum amounts of highly unsaturated drying oil of relatively light color from a given amount of HF-hydrocarbon complex. A further object is to provide an improved operating procedure for eliminating relatively saturated, dark colored hydrocarbons from aqueous HF which is to be employed for hydrolyzing HF-hydrocarbon complex for the recovery of drying oils. Other objects will be apparent as the detailed description of the invention proceeds.

In practicing the invention, an HF-hydrocarbon complex is obtained by treating a substantially aromatic-free hydrocarbon which may be a normally liquid paraffinic hydrocarbon or a dearomatized naphtha, kerosene or gas oil but which is preferably an olefin such as butylenes, amylenes, heptenes, etc., and/or mixtures thereof in monomeric form or in the form of their dimers or polymers. Such treating processes include cracking, isomerization, alkylation, polymerization, desulfurization, reforming, etc., all of which are known to those skilled in the art and hence require no detailed description. The HF-hydrocarbon complex is usually dissolved in substantially anhydrous HF, and free HF may be stripped from the complex to leave as stripper bottoms a complex containing at least about 50 weight per cent of HF.

The HF-hydrocarbon complex is intimately admixed with an aqueous HF solution containing about 40 to 45% by weight HF for effecting hydrolysis of the complex and liberation of the high quality drying oil. The aqueous HF should be substantially free from dark colored hydrocarbons which are soluble therein to a certain extent. The contact time in this mixing step may be as long as 10 to 20 minutes if temperatures of the order of 0 to 40° F. are maintained, but mixing may be effected at temperatures of about 50 to 100° F. if the contact time during the mixing step is sufficiently short, i. e. less than 30 seconds and preferably about 1 to 10 seconds. A settling time of about 5 to 30 minutes may be employed after the mixing step although relatively short separation time is desirable and may be attained by employing centrifugal separation instead of, or in addition to, ordinary settling. The amount of aqueous HF which is mixed with the HF hydrocarbon complex may be from about 1 to 10 times by weight the amount of complex and the amount is preferably selected to obtain an HF enrichment of the aqueous HF of at least about 1% but not more than 10%. It is desirable to employ a non-reactive diluent such as a light paraffinic hydrocarbon (e. g. pentane, hexane, heptane, etc.) during this first mixing and separation step.

The enriched aqueous HF which preferably contains at least about 45 weight per cent HF, but not more than 55 weight per cent HF is introduced into a still operated under conditions for overhead removal of substantially anhydrous HF. Since it is desirable that the overhead vapors be condensible with ordinary cooling water, such a still should be operated at at least about 20 p. s. i. g. or in the range of about 20 to 100 p. s. i. g. Operation at 25 p. s. i. g. with an overhead temperature of 125° F. enables the production of still bottoms containing as little as 40 weight per cent HF, while operations at about 80 p. s. i. g. results in still bottoms containing at least 42 to 43 weight per cent HF, the still bottom temperature in this case being about 340 to 350° F.

A certain amount of hydrocarbon material is soluble in aqueous HF solutions, and this amount increases rapidly with increased amounts of HF present. Thus, when an HF-hydrocarbon complex prepared by treating polymer gasoline with anhydrous HF was hydrolyzed with aqueous HF to give final HF percentages ranging from about 45 to about 55 weight per cent, it was found that at 45% HF concentration in the aqueous layer, said layer contained only .5% of the total hydrocarbons, at 50 weight per cent HF in the aqueous layer, this layer contained about 7% of the total hydrocarbons dissolved in the aqueous layer, while at 55 weight per cent HF in the aqueous layer, this layer contained 23% of the total hydrocarbons. Since it is desirable to minimize the solution of hydrocarbons in the aqueous HF layer, the amount of HF in said layer should not exceed 55% and it should preferably not exceed about 52 or 53 weight per cent.

In any case, however, some hydrocarbon material will be dissolved in the aqueous HF which is charged to the still and when this hydrocarbon material is present with the aqueous HF at the still bottom temperature of approximately 350° F., it undergoes a chemical change and is converted into a dark colored oil of low iodine number (100-150), low maleic anhydride value (10-40), high refractive index, high gravity, and in most cases a higher molecular weight. The dissolved oil apparently undergoes cyclization and at any rate it is converted into a material which would degrade the desired drying oil if it should become admixed therewith.

To avoid contamination of the high quality drying oil with the low quality, dark colored oil formed in the still bottoms, said still bottoms are cooled to approximately the same temperature as employed in the hydrolyzing step and the cooled still bottoms are intimately mixed with a diluent or wash liquid which is inert with respect to HF, a preferred diluent being a light hydrocarbon such as pentane, hexane, heptane or light naphtha fraction. The diluent or wash liquid is then separated from the still bottoms and in said separation step substantially all of the low quality, dark colored oils are removed from the aqueous HF so that the aqueous HF from the still bottoms may be reused in a cyclic manner for hydrolyzing further amounts of HF-hydrocarbon complex.

A part of the enriched aqueous HF separated from the drying oil may be directly recycled for admixture with additional amounts of HF-hydrocarbon complex; this may be advantageous in some cases to aid in the mixing step but is usually not necessary.

The high quality drying oil and the low quality, dark colored oil which are thus obtained from the HF hydrocarbon complex are separately stripped to remove diluent and any remaining free HF, the latter being simply recycled with diluent for further use in the process. Any further HF acidity may be neutralized with aqueous caustic and the products are then ready for use or for fractional distillation into products of desired boiling range.

The invention will be more clearly understood from the following description of a specific example thereof read in conjunction with the accompanying drawing which is a schematic flow diagram illustrating the operation of the process.

A butane-butylene stream produced by catalytic cracking of hydrocarbons and containing about 40% butylenes is introduced by line 10 to mixing valve 11 wherein it is admixed with HF from line 12 with an HF/B—B charge weight ratio of about .6, corresponding to an HF/olefin ratio of about 1.5. The mixed stream is passed through heater 13 and thence through a baffle reactor 14 which may be provided with a motor driven stirrer 15. The reactor in this case is operated at about 350 p. s. i. g. and at a temperature of about 200° F. with a space velocity of about 5 v./hr./v. The total reactor effluent passes by line 16 to settler 17 from which the lower acid phase is withdrawn from line 18 and the upper hydrocarbon phase by line 19, any gases which are formed being discharged by line 20 for separation and/or neutralization of HF by any known means (not shown).

The upper hydrocarbon phase is stripped in any known manner to remove dissolved HF and when fractionated gives a yield of about 8% by weight pentanes, 28% by weight C₆-400° F. gasoline having a CFR-M octane number of 71 and about 5 weight per cent of 400° F.+gas oil, the remainder being chiefly isobutane and normal butane.

The acid phase is introduced by line 18 to stripping column 21 which is operated under such conditions as to remove uncombined anhydrous HF overhead through line 22 and to discharge as bottoms through line 23 an HF-hydrocarbon complex containing about 50 weight per cent HF. The total acid phase leaving the base of settler 17 through line 18 will contain 15-20% of HF-oil and 80-85% of free HF. Most of the HF can thus be separated from this phase by a simple stripping or flashing operation at a temperature of approximately 300° F. but it is important that the stripper bottoms contain at least about 45 to 55 or about 50 weight per cent HF in order to avoid decomposition of the complex at this stage. Removal of more than the defined amount of HF by stripping or distillation inevitably results in degradation of the product drying oil.

The HF-hydrocarbon complex withdrawn from the stripper through line 23 is cooled in heat exchanger 24 to a temperature in the range of about 0 to 100° F., preferably about 50 to 90° F., admixed with a light paraffinic hydrocarbon diluent from line 25 and introduced into mixer 26 together with about 4 or 5 parts by weight of aqueous HF from line 27, said aqueous HF containing about 43% HF by weight and being previously freed from dark colored oils. The contact time in mixer 26 in this example is only about 3 seconds and any type of mixer may be employed which will give the desired intimacy of mixing in the short contact time. The mixture then passes by line 28 to settler 29 wherein an average settling time of about 15 minutes permits separation of the diluent-drying oil hydrocarbon phase which is withdrawn through line 30 and subsequently stripped and neutralized, the recovered diluent (which may contain a small amount of HF) being recycled by lines 31 and 32 to diluent storage tank 33. The neutralized drying oil thus obtained constitutes 83% of the total oil component of the HF-hydrocarbon complex (10% based on initial B—B charging stock) and is characterized by the following properties:

| | |
|---|---|
| Specific gravity | 0.8735 |
| Refractive Index at 25° C | 1.4922 |
| Maleic anhydride value | 340 |
| Iodine number | 419 |
| Molecular weight | 289 |
| Color, Gardner | 14 |

The enriched aqueous acid phase is withdrawn from settler 29 through line 34 and a part of this withdrawn stream may be recycled by pump 35 and line 36 back to mixer 26. For producing more viscous products, a sufficient amount of aqueous HF from line 27 may be employed to obtain an enriched aqueous HF concentration upwards of about 50 weight per cent and even as high as 65 weight per cent. However, in this example, the concentration of the enriched aqueous HF withdrawn through line 34 is about 49 to 50%.

The enriched aqueous HF containing 49% HF is introduced by line 37 to HF still 38 which in this example is operated at about 80 p. s. i. g. with a still bottom temperature of about 350° F. and with anhydrous HF reflux at its top. Anhydrous HF is removed overhead through line 39 and this HF together with HF removed through line 22 is returned by line 40 to condenser 41 and thence to HF storage tank 42.

The tower bottoms which leave still 38 through line 43 contain aqueous HF with about 43 weight per cent HF therein and also contain dark colored, low quality oil resulting from the conversion of dissolved hydrocarbon material in still 38. The still bottoms are cooled in heat exchanger 44 with ordinary condenser water and then passed through mixer 45 into which an HF-inert wash liquid such as light paraffinic hydrocarbon (pentane, heptane, hexane, light naphtha, etc.) is introduced by line 46 in an amount sufficient to wash the dark colored oils out of the acid phase, the mixture being introduced by line 47 to settler 48. The diluent and dark colored oil are removed by line 49 for stripping, final neutralization, and fractionation, the stripped diluent being returned by line 32 to diluent storage tank 33. The clean aqueous HF layer is withdrawn by line 27 and returned by pump 50 to mixer 26. While a single washing stage has thus been shown, it should be understood that a plurality of washing stages may be used and/or the cooled still bottoms may be countercurrently contacted with a wash liquid to remove dark colored oil and/or other undesirable impurities from the aqueous HF which is employed for hydrolyzing the HF-hydrocarbon complex.

The low quality oil removed through line 49 after stripping and neutralization constitutes about 17% of the total hydrocarbon content of the HF-hydrocarbon complex (about 2% based on total B—B charging stock). The properties of this low quality oil are as follows:

| | |
|---|---|
| Specific gravity | .9430 |
| Refractive Index at 25° C | 1.5278 |
| Maleic anhydride value | 36 |
| Iodine number | 144 |
| Molecular weight | 307 |
| Color, Gardner | 18+ (dark) |

The high quality drying oil obtained by stripping and neutralizing the product withdrawn through line 30 appears to be a complex mixture of many hydrocarbons of similar molecular type, chiefly ranging in molecular weight from about $C_{14}$ to $C_{22}$. It is predominantly a mixture of polycyclic hydrocarbons and is made up largely of molecules containing 2 and 3 rings per molecule. The average molecule contains 3 double bonds which are predominantly present in the ring system. In addition, the important and distinguishing characteristic of this high quality drying oil is the fact that, on the average, approximately 2 of the 3 double bonds present in the molecule are in conjugation (i. e., —C=C—C=C). This conjugated double bond structure imparts a high degree of reactivity which makes possible the production of many useful derivatives.

The high quality oil itself and fractions thereof air-dry moderately fast in thin layers to produce resinous films of fairly low molecular weight (about 450-550). The films are brittle and soluble in aromatic solvents. Such oil is useful in ink oils, aluminum paints, baking type can coating, water emulsion wall paints, interior enamels, etc. Because of its hydrocarbon structure, such oil imparts gloss, hardness and water- and caustic-resistance to the films. The most important use of the oil, however, is in connection with its derivatives rather than the oil itself, particularly the maleic adducts which are convertible to alkyd resins. To prepare an alkyd resin, the oil is first converted to a dibasic acid by reaction with maleic anhydride which proceeds rapidly at 100° C. This adduct is then mixed with glycerine and linseed oil or linseed fatty acids and heated with agitation at 225-265° C. A small amount of xylene is also added to the mixture to provide reflux and to enable the removal of water produced in the reaction, the water being trapped out of the reflux stream. It is thus possible to complete the preparation of the alkyd resin in 2 to 3 hours and the finished resin is recovered in xylene solution and usable directly in paints, varnishes, etc. The maleic adducts are also useful as chemical intermediates for the preparations of esters, salts and numerous other derivatives by reactions which are typical of dibasic acids and anhydrides.

From the foregoing description, it will be seen that the objects of the invention have been accomplished. The invention is not limited to the particular system or preferred examples hereinabove described since alternative systems and conditions will be apparent from the above description to those skilled in the art.

We claim:

1. The method of recovering a highly unsaturated oil and a darker, more saturated oil from an HF-hydrocarbon complex, which method comprises mixing said complex with an aqueous HF solution which is substantially free from dark colored saturated oil and which contains at least about 40, but less than 55, weight per cent HF in a first mixing zone, separating from the resulting mixture in a first separation zone a highly unsaturated oil phase from an acid phase, distilling substantially anhydrous HF from said acid phase to obtain as still bottoms aqueous HF containing at least about 40 weight per cent HF and an oil which is darker and more saturated than said highly unsaturated oil, and separating said darker and more saturated oil from the aqueous HF contained in the still bottoms by cooling said still bottoms and contacting the cooled still bottoms with a wash liquid whereby said aqueous HF may be returned to said first mixing zone without impairing the quality of said highly unsaturated oil.

2. The method of claim 1 which includes the step of introducing a light paraffinic hydrocarbon diluent into said first mixing zone and separating said highly unsaturated oil diluted with said diluent in said first separation zone.

3. The method of claim 1 in which the wash liquid is a light paraffinic hydrocarbon diluent.

4. The method of claim 1 wherein the first mixing zone is maintained at a temperature in the range of 0° to 100° F. and the contact time in the first mixing zone is less than 30 minutes.

5. The method of claim 2 which includes the further step of stripping diluent from the highly unsaturated oil which is separated in the first separation zone and returning at least a part of said diluent to said first mixing zone.

6. The method of claim 3 which includes the further step of stripping diluent from darker, more saturated oil and returning at least a part of said diluent for admixture with still bottoms.

7. The method of claim 4 wherein the first mixing zone is at a temperature in the range of about 50° to 100° F. and wherein the contact time in said first mixing zone is less than 30 seconds.

8. The method of recovering a highly unsaturated oil and a darker, more saturated oil from an HF-hydrocarbon complex, which method comprises mixing said complex in the presence of a light paraffinic hydrocarbon diluent in a first mixing zone with an aqueous HF solution which is substantially free from dissolved, dark colored hydrocarbons and which contains at least about 40 weight per cent, but less than 55 weight per cent, of HF, separating from the resulting mixture in a first separation zone a hydrocarbon phase consisting essentially of said diluent and highly unsaturated oil, distilling substantially anhydrous hydrogen fluoride from the remaider of the mixture from the first separation zone to obtain as still bottoms aqueous HF containing at least about 40 weight per cent HF and an oil which is darker and more saturated than said highly unsaturated oil, cooling said still bottoms and mixing them with a light paraffinic hydrocarbon diluent in a second mixing zone, separating from the resulting mixture in a second separation zone a hydrocarbon phase consisting essentially of said diluent and an oil which is darker and more saturated than the unsaturated oil, and returning aqueous HF from the second separation zone to the first mixing zone.

9. A hydrocarbon conversion process which comprises contacting a substantially aromatic-free hydrocarbon with HF under conditions to effect formation of an HF-hydrocarbon complex dissolved in HF and hydrocarbons which are insoluble in HF, separating the HF phase containing dissolved complex from hydrocarbons insoluble in HF, stripping said HF phase under conditions to remove HF therefrom and to leave as stripper bottoms an HF-hydrocarbon complex containing approximately 50 weight per cent HF, cooling said stripper bottoms to a temperature in the range of 0° to 100° F., admixing with said cooled stripper bottoms aqueous HF which is substantially free from dark colored saturated oil and which contains at least about 40, but less than 50, weight per cent HF and in such amounts as to obtain an HF enrichment from HF recovered from complex in the range of about 1 to 10%, separating enriched aqueous HF from highly olefinic oil released in the mixing step, distilling substantially anhydrous HF from the enriched aqueous HF to obtain still bottoms containing aqueous HF with at least about 40 weight per cent HF therein and a dark colored oil, separating the dark colored oil from the aqueous HF contained in the still bottoms by cooling said still bottoms and contacting the cooled still bottoms with a wash liquid and returning said last named aqueous HF for further admixture with HF-hydrocarbon complex.

10. The method of claim 9 wherein a light paraffinic hydrocarbon diluent is employed in at least one of the separation steps.

11. The method of claim 9 which includes the step of recycling part of the enriched aqueous HF for admixture with HF-hydrocarbon complex.

12. The method of claim 9 wherein the aqueous HF containing about 40 to 45 weight per cent HF is admixed with HF-hydrocarbon complex and the enriched aqueous HF contains about 45 to 55 weight per cent HF.

13. The method of claim 9 wherein the substantially aromatic-free hydrocarbon is a low boiling olefin.

ROBERT J. LEE.
PAUL D. MAY.

No References Cited.